March 3, 1964    E. M. SHOOK    3,123,799
IDENTIFICATION OF THE TIME OF ARRIVAL OF SEISMIC EVENTS
Filed Nov. 25, 1959    2 Sheets-Sheet 1

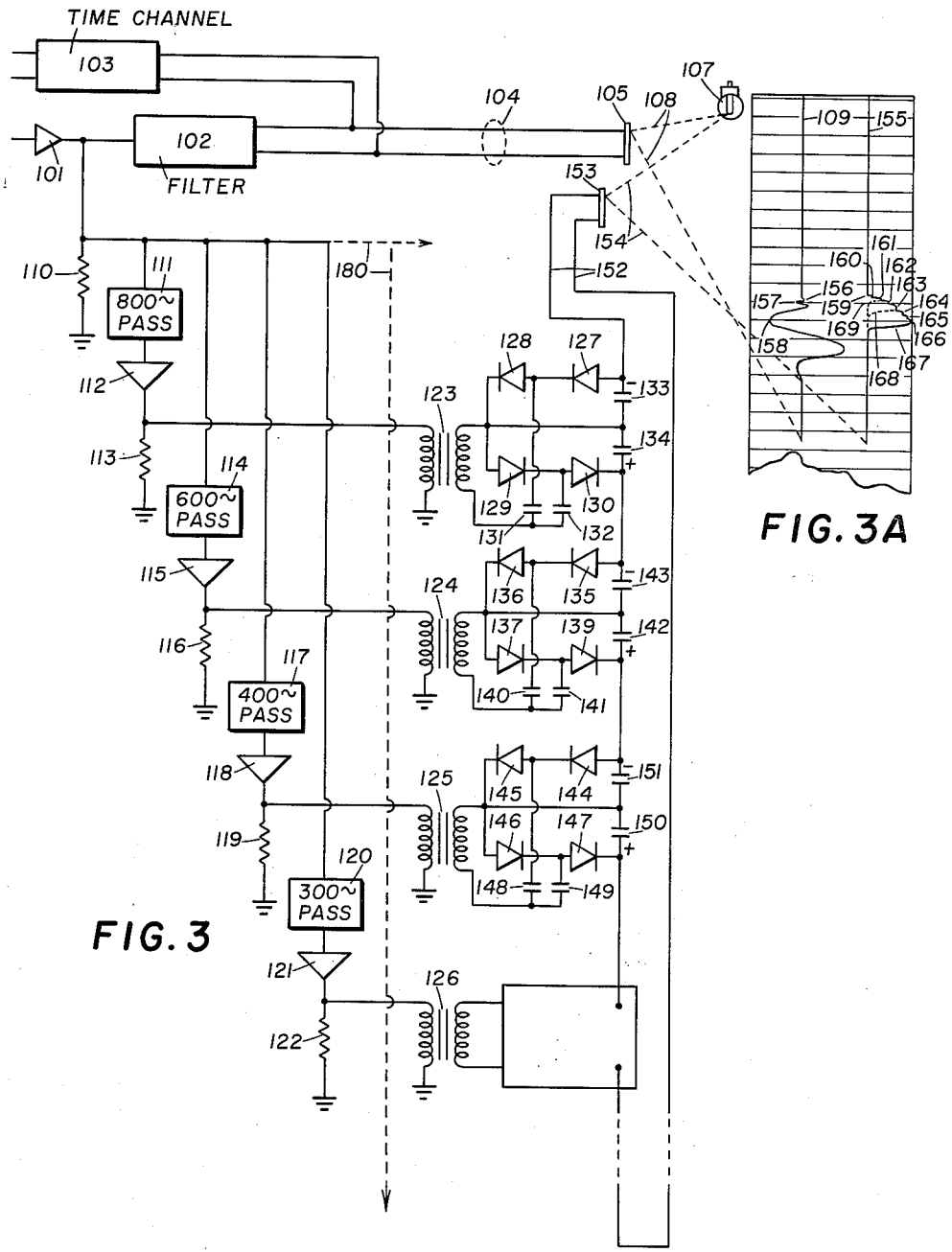

United States Patent Office 3,123,799
Patented Mar. 3, 1964

3,123,799
IDENTIFICATION OF THE TIME OF ARRIVAL OF SEISMIC EVENTS
Earley M. Shook, Dallas, Tex., assignor to Socony Mobil Oil Company, Inc., a corporation of New York
Filed Nov. 25, 1959, Ser. No. 855,389
10 Claims. (Cl. 340—15.5)

This invention relates generally to seismic exploration and more particularly to methods and means for deriving from the seismic signal electrical marker signals which are indicative of the initial arrival of seismic events and which may be utilized to mark the seismogram and/or to operate automatic reading apparatus in connection with data processing operations.

In seismic exploration, determination of the shape and determination of the size of subsurface feaures are the primary objectives. Shape and size of subsurface features are interpreted in terms of traps for the possible accumulation of oil. Actual depth of these features to a high degree of accuracy is desirable, but this is considered to be of less importance than shape and size. A reasonably constant error in depth which does not alter the shape of the subsurface picture therefore may be acceptable.

Seismic data are plotted on scaled contour maps which display shape, size, and depth of the subsurface features. Usually there is one such map made for each reflecting horizon or interface. Such maps are like surface contour maps. The chief difference is that a contour on a seismic map is a line drawn through points of equal elevation below sea level; where a contour on a surface map is a line drawn through points of equal elevation usually above sea level.

Surface elevations are determined quite accurately by the use of a transit or level and a calibrated rod which may be read to a fraction of an inch. As often as practical, the surveyor runs on the surface a continuous line of levels and returns over a separate route to a point whose elevation has been previously determined, a procedure involving closing a loop. To successfully close the loop, however, the elevation of the point as previously determined must check with the elevation as determined from the surveyor's field notes taken around the loop. When the loop is successfully closed, the surveyor assumes the work done around that loop to be accurate and he proceeds with confidence. Since the elevation of each point is determined to a fraction of an inch, the details of the surface which the map displays is determined by the density of the surveyed points and the vertical interval between adjacent contours.

There is a counterpart to all the above elements in seismic surveying and mapping. The major difference lies in the accuracy with which depth points are determined. The time T as read on the seismogram between the instant of detonation of dynamite and the arrival of a reflection is twice the one-way travel time. An interval T/2 multiplied by the average velocity of sound is the length of the path from the point of detonation to the point of reflection from a reflecting interface or the "slant depth" for the reflecting point on the interface. Solution of a right triangle yields the actual vertical depth. Typical of average velocities of sound in the earth is a velocity of 12,000 feet per second. An error of .002 second in determination of the time from a seismogram would result in an error of 12 feet in depth. If an error of .020 second is made in reading the seismogram, then the error in depth is 120 feet. With a probable error of 120 feet for each depth point, it would be futile to try to make a contour map with contour intervals of 50 feet. A higher density of data, or anything else besides higher accuracy of time determination, will not permit the map to display the depths of 50-foot accuracy.

Modern trends throughout the seismic exploration industry have led interpreters to choose or pick the bottom of some high-amplitude excursion or swing as the reflection time. There is no place between the bottoms of two adjacent high-amplitude swings which is acceptable. The reflection time, as now picked by the average interpreter, must be in the bottom of one or the other of these high-amplitude swings. This means that if an error is made in selecting which of the excursions to use for the reflection time from a given interface from one seismogram to the next, the minimum error that can be made is the time between the bottom of two adjacent high-amplitude swings. Comparing this with surface surveying, it is equivalent to the surveyor's sighting a rod made up of rather long segments with no calibrations in feet and inches at all and having the rodman report how many sections are required for the surveyor to see it through the transit or level. FIG. 1 is a reproduction of a portion of a seismogram that illustrates the problem. The numbers 27–31 across the top are the times in tenths of a second from the detonation instant (not shown), 27 being read as 2.7 seconds in actual time. The time between any two vertical lines is .01 second. If the arrival time of the reflection could be pinpointed on the seismogram, it could be read to a possible accuracy of one-tenth of the time between two vertical lines, or .001 second. Geophysicists would agree that a reflection is recorded somewhere in the vicinity of time 29 as marked on the record. Greater amplitude plus alignment from top to bottom across the seismogram of recorded events as displayed here are the criteria. Errors in the determination of the reflection time often give rise to significant errors in depicting the shape and size of subsurface features. Current trends have led the interpreter to pick the reflection in the vicinity of the dotted lines B, C, or D. Just which one is chosen as the one to follow on this and related seismograms is determined by a number of criteria, including the amplitude and the ratio of desired signal to extraneous signal. The personality of the party making the analysis also enters in. The way he has observed other interpreters and his knowledge of wave propagation and wave mechanics are also factors. He might examine a number of seismograms before deciding which bottom swing he would attempt to pick. Ordinarily it is assumed that the high-amplitude swing chosen may be identified on all seismograms, and further that the bottom of the high-amplitude swing he chooses always bears the same time relation to the initial arrival of the energy in the reflection. Both of these assumptions are in error to varying degrees, depending upon variations in the frequency components involved in the transient signal from seismogram to seismogram. The number, amount, and arrangement of the frequency components are altered by the nature of the earth formations through which the sound waves travel and the nature of the electrical circuits and transducers through which the corresponding electrical waves travel. The closing of a loop as described earlier may be done successfully sometimes by following the bottom of the swing at B, C, or D, but when this is done it may mean that very little or no subsurface anomalous condition was present. Often, however, loops fail to close successfully when making this kind of interpretation. Most of these fail to close by the amount of depth corresponding to the time between the bottom of two adjacent swings. A careful recheck of all the interpretation around the loop reveals no reason for the failure of the loop to close. Since classically "the loop must close," the interpreter resorts to the artifice of jumping from the bottom of one high-amplitude swing to the bottom of the adjacent high-amplitude swing which allows the loop to close. At a point where the jump is made, the interpreter indicates on the map a vertical fault crossing with its throw equivalent to the time between the bottom of the two adjacent high-amplitude swings on the seismogram. Many seismic maps indicate a number of such erroneous "one leg" or one-cycle faults. As the vertical dimension of the feature to be mapped becomes less, closer contours are required to determine its shape; and as the contour interval is reduced to approach the magnitude of these erroneous vertical faults, the map becomes of little value.

The arrival of the initial energy in the reflection in the vicinity of time 29, FIG. 1, is indicated by the dash line A. It is the time marked by the discontinuity on the recording when the trace or traces started doing something different. The first arrival of energy in the reflection "marks" the recording, and, although generally a low amplitude indication, it provides the recording with a discontinuity which is meaningful. Such discontinuity on one seismogram might cause all the traces to break upward, and on the next seismogram cause all the traces to break downward; or on the same seismogram the discontinuity might cause part of the traces to break upward and part of them to break downward. The discontinuity nevertheless is the reliable "mark" on the recording. U.S. Patent 2,161,764 discloses the importance of the initial arrival of energy in a reflection and provides for differentiation of the entire seismic signal in an effort to make the initial arrival more distinct.

Despite the importance and reliability of the discontinuity which marks the initial arrival of energy in a reflection, the trend in interpretation continues to be toward picking the bottom of some high-amplitude swing as the "reflection time." It is claimed the low-amplitude discontinuity indicated at A, FIG. 1, cannot always be followed around a loop or over an entire area. Although the greater-amplitude swings which line up from top to bottom across the seismogram provide the first approximation for the reflection time, they have become the ultimate time determinations principally because of their amplitude.

It is the object of this invention, in addition to recording the conventional seismogram, to derive marker signals from the seismic signal occurring at the initial arrival of energy of a reflection and to record the marker signals simultaneously on the seismogram, either on separate traces or superimposed on the high-amplitude marker signals on the traces of the seismogram.

It is also an object of this invention to derive high-amplitude marker signals coincident with the initial arrival of energy in a reflection and utilize the marker signals to actuate automatic reflection-picking apparatus.

This invention is based on the fundamental principle that high frequencies are involved in the signal which produces the discontinuity of reflection beginnings. The discontinuity as indicated at A, FIG. 1, the initial arrival of energy in the reflection, is characterized by higher frequency components than exist in the signal immediately before or immediately after its occurrence. The amplitude of these components and their order of frequency are dependent upon the amplitude and sharpness of the discontinuity. In the case shown at A, FIG. 1, only that part which is left after filtering is recorded and seen. Most filters in seismic systems are adjusted to emphasize swings B, C, and D, which contain lower order of frequencies. The present invention provides for the seismic signal a separate channel which emphasizes a higher order of frequencies, namely, those frequencies necessary to produce the discontinuities which characterize the initial arrival of energy in the reflection. Such frequency components may be recorded directly or may be rectified and recorded. The amplitude of such components may be enhanced and rectified by voltage multipliers and then recorded.

It is a further object of the present invention to provide a method and apparatus for simultaneously recording a seismic signal from a detector in a first band of frequencies and for recording a signal representative of changes in frequency content of such seismic signal in order that a distinctive marker may be provided at the onset of each reflection component of said seismic signal.

In a more specific aspect, there is provided a system in which a circuit is provided with means for deriving a high-amplitude marker from the seismic signal which is representative in time of and proportional to variations in the frequency of the seismic signal. The circuit is then provided with means for recording such markers as a function of time related to the instant of initiation of the seismic waves giving rise to the seismic signal.

In a still further aspect of the invention, a rectifying-voltage multiplier is employed for providing a unidirectional, high-amplitude marker coinciding in time with each onset of a seismic reflection.

For further objects and advantages of the present invention reference may now be had to the following description taken in conjunction with the accompanying drawings in which:

FIG. 3 illustrate a modification of the invention; and

FIG. 3A is a fragmentary record made in accordance with the modification of FIG. 3.

Figure 1:
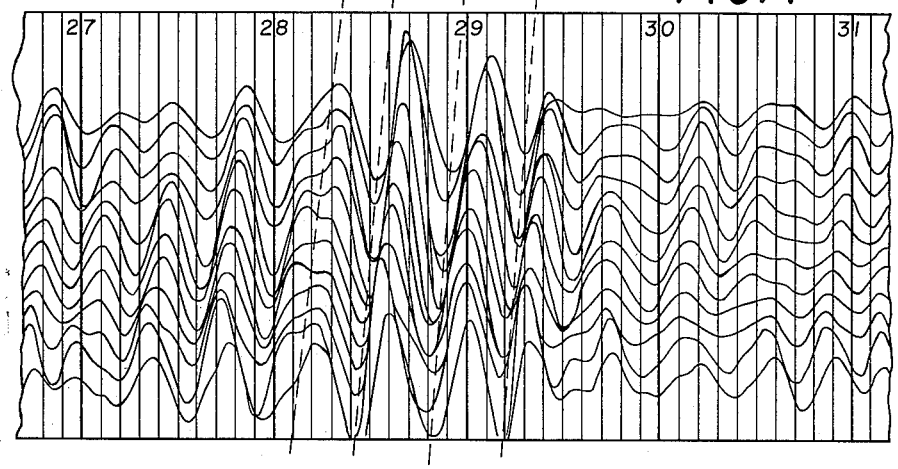
FIG. 1 is a fragmentary portion of a field seismogram.
Figure 2:
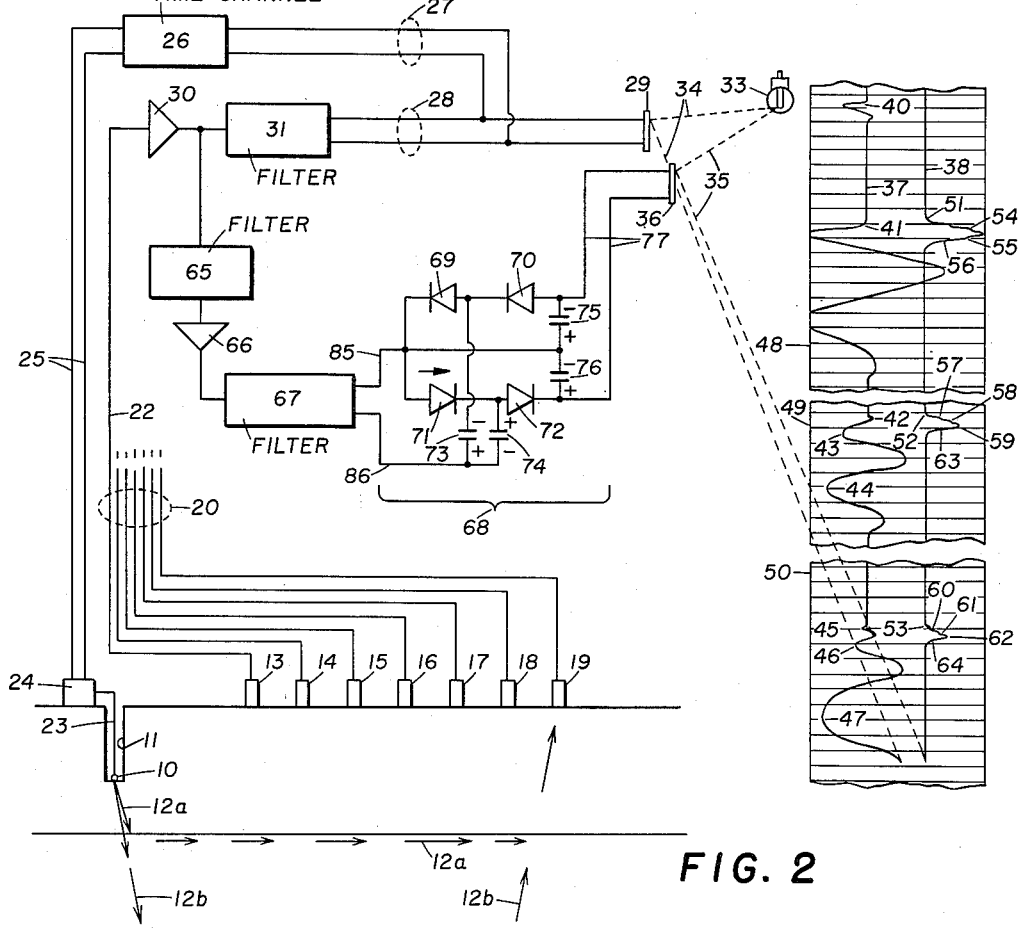
FIG. 2 illustrates a first embodiment of the invention in which marker signals are derived from a seismic signal.

Referring to FIG. 2, there is illustrated a normal seismic system with one channel indicated partially in block form. Detector 13 is connected by channel 22, amplifier 30, filter 31, and conductors 28 to a mirror-type galvonometer 29. It is to be understood that detectors 14–19 similarly are connected to separate channels (not shown) to provide a multirace seismogram. A beam of light 34 from source 33 is reflected from galvanometer 29 to produce a record trace 37 on the light-sensitive chart which is partially shown in three sections 48, 49, and 50. When a dynamite charge 10 in shothole 11 is detonated by an electric blaster 24, an electric pulse is transmitted over conductors 25 to the time channel unit 26, thence by way of conductors 27 and 28 to the mirror-type galvanometer 29. The recorded pulse 40 marks the instant the dynamite is detonated, and since it is the beginning of time for the seismogram being recorded, it is called the time break. All events recorded on the record are measured from this recorded impulse by means of the equally-spaced, vertical lines spaced .01 second apart.

The impules 40 on trace 37 is a typical time break representing the instant of detonation of the dynamite 10. The first energy reaching detector 13 travels principally along the top of the shallowmost, high-velocity layer as indicated by arrows 12a. This is a refraction path and the recorded first energy is called the "first break." The refracted wave striking detector 13 is converted to electrical waves, and the electrical wave is transmitted through the normal seismic channel, including amplifier 30, filter 31, and conductors 28 and is recorded on trace 37 beginning at time 41. Subsequently, seismic waves traveling downwardly, as indicated by arrows 12b, are reflected back by reflecting subsurface interfaces and strike detector 13. The resultant electrical wave is transmitted through the normal seismic channel and recorded on trace 37 in section 49 of the light-sensitive chart beginning at time 42. A reflection from still a deeper reflecting interface (path of the seismic wave not shown) is recorded on trace 37 in section 50 of the light-sensitive chart beginning at time 45. Reflections may take on many other different shapes. They all have a beginning, however, and the discontinuities at times 42 and 45 are considered representative of typical reflection onsets. The entire seismic signal recorded on trace 37 passed through filter 31, which is adjusted to emphasize the high-amplitude swings 43, 44, 46, and 47 which generally are predominantly of lower order of frequency, below 150 cycles.

In order to emphasize the higher order of frequencies in the reflection beginning at times 42 and 45, the unfiltered seismic signal appearing at the output of amplifier 30 passes through a separate circuit, consisting of bandpass filter 65, amplifier 66, bandpass filter 67, and voltage quadrupler 68 to a second mirror-type galvanometer 36, where the light beam 35 from source 33 is reflected to the light-sensitive chart to produce record trace 38 simultaneously with trace 37. Bandpass filters 65 and 67 emphasize frequencies in the range of from 200 to approximately 800 cycles per second. Amplifier 66 is included to bring the signal to a desired working level.

Condensers 75 and 76 are selected with reference to the resistance of galvanometer 36 in order to provide a short time constant so that charges stored on these condensers will leak off rapidly. An alternate method for adjusting the time constant is to connect a variable resistor directly between the two conductors 77. Although voltage quadrupling is important in this application, especially in obtaining greater amplitude, the discrimination against lower frequencies and against random noise of short duration is also of prime importance. These characteristics of circuit 68 will become evident upon a step-by-step explanation of the manner in which voltage is built-up from zero across condensers 75 and 76 in series.

In FIG. 2, it is assumed initially that no charge, and therefore no voltage, exists on any of the condensers. At a given instant, as indicated at time 42 on trace 37, the initial energy in a reflection arrives at detector 13. The resulting signal containing a relatively higher order of frequencies is passed through filters 65 and 67. These filters pass frequencies in a selected portion of the band, approximately 200–800 cycles, to circuit 68. When conductor 85 first becomes positive with respect to conductor 86, current flows in the low-resistance direction (the direction of the arrow) through diode 71 and charges condenser 74 to the peak value of the applied voltage with its top plate positive as shown. Subsequently during the time when the input voltage is reversing between conductors 85 and 86 (when it passes through zero), the voltage across condenser 74 acts in the low-resistance direction of diode 72 and current flows through three parallel paths. The principal or most significant path is from the positive plate of condenser 74 through the low-resistance direction of diode 72 through condenser 76 and back through conductor 85, filter 67, to negative conductor 86. This changes the charge on condenser 76 to slightly less than the input peak value. This charge on condenser 76, as well as current flowing through the galvanometer 36, produces a deflection of galvanometer 36 as indicated at time 57. When the A.C. input is reversed making conductor 86 positive with respect to conductor 85, two things occur. One is the input voltage plus the remaining voltage across condenser 74 during the first half cycle, acting in series, add and thereby cause current to flow from the positive plate of condenser 74 through diode 72, condenser 76, negative conductor 85, and filter 67 to positive conductor 86. This charges condenser 76 to a voltage slightly less than twice the peak value of the input voltage. The second thing which occurs is that current flows from conductor 86 through condenser 73 and diode 69 (low-resistance direction) back to conductor 85. This charges condenser 73 with the bottom plate positive as shown. Both these voltages in combination with other parallel circuits combine to deflect galvanometer 36 still further as indicated at time 58. Now when conductor 85 becomes positive with respect to conductor 86 the second time, two things occur. One is condenser 74 is charged again as previously described and secondly the two voltages, the A.C. peak input voltage plus the voltage across condenser 73 from the previous half cycle, combine in series to charge condenser 75 to a value slightly less than twice the A.C. input peak value, the bottom plate of condenser 75 being of positive polarity as shown. The two voltages, the one across condenser 75 and the one across condenser 76, add in series to a total value slightly less than four times the peak value of the input voltage and this is indicated by the deflection 59 of the galvanometer 36. The accumulation of voltage across condensers 75 and 76 is predicated upon the frequency's being high enough to add to the total charge of capacitors 75 and 76 before the previous charge leaks off. Failure of capacitors 75 and 76 to receive additional charges within the time determined by the time constant as previously stated results in the voltage thereacross falling to zero and the consequent deflection of galvanometer 36 falling to zero. The rate at which the voltage falls is indicated at times 63 and 64 where it is assumed no additional charge is received. A derived pulse is also indicated beginning at time 51, trace 38, corresponding to the arrival of the first break 41 on trace 37.

Thus, from the electrical signal representative of earth movement at detector 13 following detonation of charge 10, there is derived a signal of substantially high amplitude which is in the form of a marker on trace 38 representative in time to the time occurrence of the onset of the reflections as at times 42 and 45. The signals 59 and 62 are thus essentially proportional in amplitude to variations in the frequency of the signal from detector 13. The reflection signals and the marker signals are recorded in side-by-side relation on traces 37 and 38, respectively, whereby each onset on reflection trace 37 may be more positively identified.

FIG. 3 illustrates a modification of the invention utilizing full-wave, voltage-multiplying rectifiers to obtain a marker at the reflection onset. In FIG. 2, it is required that filters 65 and 67 be adjusted to pass a narrow band of frequencies somewhere between 200 and 800 cycles, which includes a significant component in the reflection beginning. This requirement is eliminated by the arrangement shown in FIG. 3. This arrangement has a number of circuits similar to the one shown in FIG. 2. The normal seismic channel is represented in FIG. 3 by amplifier 101, seismic filter 102, and galvanometer 105 for producing a record on trace 109 on the light-sensitive chart. The unfiltered seismic signal appearing between amplifier 101 and seismic filter 102 is applied to resistor 110. The voltage drop across resistor 110 is applied to a plurality of filters. More particularly, filter 111 passes frequencies in a band centered at 800 cycles; filter 114 passes frequencies centered at 600 cycles; filter 117 passes frequencies centered at 400 cycles; and filter 120 passes frequencies centered at 300 cycles. Voltages at those frequencies (if they exist in the seismic transient) appear respectively across resistors 113, 116, 119, and 122. Voltage quadruplers are connected to the output of each of the filters, three of which are illustrated. The filters 111, 114, 117, and 120 are sharp enough to practically eliminate the peak frequency of the adjacent filter but preferably are not so sharp as to cause ringing. The output condensers 133, 134, 142, 143 and 150, 151 are selected so they lose their charge rapidly as explained above.

The detailed explanation of the accumulation of voltages across the condensers 133 and 134, 142 and 143, 150 and 151 is the same as previously explained in connection with FIG. 2. The polarity of the voltages is such that the bottom plates of all condensers are positive. With the connection as shown, all of these voltages add in series giving deflection to galvanometer 153 in only one direction irrespective of the phase or polarity of the seismic signal. No interference results to the remaining D.C. output when one or more of the frequency components is missing. For example, if there is no 600-cycle component in the seismic signal, no voltage across condensers 142 and 143 will exist. Direct current from the other outputs is shunted around condensers 142 and 143. The remaining voltages across condensers 133 and 134 and 150 and 151 cause current to flow from the bottom or positive plate of condenser 150, through the galvanometer 152, through condensers 133 and 134, thence through the four diodes 135, 136, 137, 139, through condenser 151, back to the negative plate to condenser 150. In tracing the above circuit, all the voltages across condensers 133, 134, 151, and 150 are added in series.

The performance of the marker circuit is illustrated in FIG. 3A where the marker beginning at time 159 on trace 155 marks the beginning of the conventionally recorded reflection beginning at time 156 on trace 109. The earlier rectified pulses 160 and 161 are derived from the higher-frequency components. It is assumed for explanation purposes that galvanometer 153 will respond to these high-frequency pulses. The subsequent rectified pulses 162 to 166 are derived from lower-frequency components. This does not rule out the possibility of simultaneous or superimposed high- and low-frequency pulses if they are so disposed in time.

The illustration given assumes dispersion as usually encountered, that is, the high-frequency components arrive ahead of the lower frequencies. In the absence of pulses derived from any frequency subsequent to pulse 161, the galvanometer deflection would fall to zero along a curve such as the dotted curve 169. In fact, for the condition shown, the voltage from the high-frequency pulses does actually fall to zero and the peak value of pulse 162 is due entirely to the peak A.C. value of the component from which it is derived, because by the time pulse 162 reaches its peak the voltage which produced pulse 161 has fallen to zero. In other words, the peak value of pulse 162 is, in the illustration shown, about the same as it would be if pulses 160 and 161 were absent. Reproduction of the individual peaks as illustrated is dependent upon the characteristics of the galvanometer.

A galvanometer with limited frequency response would tend to smooth out the individual peaks. The actual recording in the practical case for the assumed frequencies and distribution would be one rather high-amplitude pulse beginning at or very near the same time of arrival of the reflection beginning. Differences in transmission times between the alternate circuits and between them and the conventional seismic circuit may be compensated by appropriate use of phase distortion correctors such as described and claimed in U.S. Patent No. 2,725,534 to William B. Hemphill, a co-worker of applicant. Since the high frequencies which are significant in the reflection beginning suffer less time delay than the lower frequencies, the necessity for phase correction becomes less important when attention is drawn to the beginning of reflections.

Although the alternate arrangement of FIG. 3 illustrates the use of voltage multipliers as one embodiment of the invention, other full-wave type of rectification may be found to be suitable.

It should be noted that additional circuits may be employed as indicated by the dotted lines and arrows 180 of FIG. 3. It is fully anticipated that these alternate circuits may be extended to include the frequencies in the range of from 20 to 150 cycles. This is generally conceded to be the range which includes the high-amplitude swings most commonly accentuated in current seismic operations. By inclusion of these lower-frequency components to be rectified and combined with the previously described higher-frequency components, high-amplitude line-ups (the criterion for a recorded reflection) may be located on a multitrace recording, including traces similar to trace 109 of FIG. 3, with as much facility and assurance as is currently done with conventional multitrace recordings. Since in the conventional recording there are cases where the instantaneous amplitude may be low due to components of opposite phase canceling each other, the direct addition of rectified components regardless of polarity as illustrated may produce greater relative deflection and greater attraction to the eye of an interpreter.

While the invention has been described in connection with certain specific embodiments thereof, it will now be understood that further modifications will suggest themselves to those skilled in the art and it is intended to cover such modifications as fall within the scope of the appended claims.

What is claimed is:

1. In seismic exploration where a first electrical signal is generated which is representative of earth movement at a detecting station resulting from the initiation of a seismic wave at a sending station, the system which comprises means for selecting a band of frequency components from said first electrical signal to produce a second signal, means for amplifying and recording said second signal as a function of time relative to the initiation of said seismic wave at said sending station to produce a variable amplitude record, means for deriving from said second electrical signal unidirectional markers proportional in magnitude to components of said electrical signal having a frequency uniquely representative of the onset of seismic reflections, and means connected to the output of said amplifying means for recording said markers on the same time scale and adjacent to said variable amplitude record for indicating the time occurrence of said components in said electrical signal.

2. In seismic exploration where an electrical signal is generated which is representative of earth movement at a detecting station resulting from the application of energy to the earth at a sending station to produce seismic waves, a system which comprises a circuit including means for sensing high frequency variations of said signal uniquely representative of the onset of seismic reflections, a voltage multiplier for deriving high-amplitude unidirectional markers from said sensed variation in said signal representative in time of and proportional in magnitude to said variations of frequency of said signal, and means in said circuit for recording said markers as a function of time related to the instance of initiation of seismic waves at the sending station, the output of said voltage multiplier being connected to said recording means.

3. In seismic exploration where an electrical signal is generated which is representative of earth movement at a detecting station resulting from the application of energy to the earth at a sending station to produce seismic waves, a system which comprises a circuit including means for sensing high frequency variations of said signal uniquely representative of the onset of seismic reflections, means connected to the output of said sensing means for deriving high-amplitude unidirectional markers from said signal representative in time of and proportional to said component of said signal, and means in said circuit for recording said signal and said markers in side-by-side relation both as functions of time related to the instant of initiation of seismic waves at the sending station, the output of said means for deriving high-amplitude markers being connected to said recording means.

4. A system for recording seismic signals produced by detectors at receiving stations in response to generation of seismic waves at a sending station, which comprises an amplifying-filtering circuit for each seismic signal, each circuit having at least two paths the first of which includes a filter means for selecting from said seismic signal a predetermined band of frequencies, a recorder having a first input connected to said first path for recording a visual representation of a first band of frequencies and a second input, a second path including a filter means for selecting a second band of frequencies substantially higher than the frequencies of said first band, rectifying and voltage-amplifying means in said second path for producing high-amplitude, unidirectional representations of said second band of frequencies, and means for connecting said second path to said second input of said recorder for producing a record of said representations whereby a distinctive recorded indication of the appearance of high-frequency components marking the onset of a reflection will be recorded in time correlation with the recorded components of said first band clearly to indicate the time occurrence of said onset.

5. A system for recording seismic signals produced by detectors at receiving stations in response to generation of seismic waves at a sending station, which comprises an amplifying-filtering circuit for each seismic signal, each such circuit having at least two paths the first of which includes a filter means for selecting from said seismic signal a first predetermined band of frequencies, a recorder having a first input connected to said first path for recording a visual representation of signals in said first band of frequencies and a second input terminal, a second path including a filter means for selecting a second band of frequencies higher than the frequencies of said first band, a third path including filter means for selecting a third band of frequencies higher than said second band, means in said second path for producing a second output unidirectional in character and representative of signals in said second band, means in said third path for producing a third output unidirectional in character and representative of signals in said third band, and means interconnecting said second path and said third path and the second input terminal of said recorder for applying a unidirectional signal to said second input representative of the combined signals in said second path and said third path for identifying the onset of high-frequency portions of reflection components of signals in said first path.

6. A system for recording seismic signals produced by detectors at receiving stations in response to generation of seismic waves at a sending station, which comprises an amplifying-filtering circuit for each seismic signal, each such circuit having at least two paths the first of which includes a filter means for selecting from said seismic signal a first predetermined band of frequencies, a recorder having a first input connected to said first path for recording a visual representation of signals in said first band of frequencies and a second input terminal, a second path including a filter means for selecting a second band of frequencies higher than the frequencies of said first band, a third path including filter means for selecting a third band of frequencies higher than said second band, rectifiers in said second path for producing a second output unidirectional in character and representative of signals in said second band, rectifiers in said third path for producing a third output unidirectional in character and representative of signals in said third band, and means for connecting said rectifiers in said second path and said rectifiers in said third path to the second input terminal of said recorder for applying a single, unidirectional signal to said second input representative of the combined signals in said second path and said third path for identifying the onset of high-frequency portions of reflection components of signals in said first path.

7. A system for recording seismic signals produced by detectors at receiving stations in response to generation of seismic waves at a sending station, which comprises an amplifying-filtering circuit for each seismic signal, each such circuit having at least two paths the first of which includes a filter means for selecting from said seismic signal a first predetermined band of frequencies, a recorder having a first input connected to said first path for recording a visual representation of signals in said first band of frequencies and a second input terminal, a second path including a filter means for selecting a second band of frequencies higher than the frequencies of said first band, a third path including filter means for selecting a third band of frequencies higher than said second band, voltage-quadrupling rectifiers in said second path for producing a second output unidirectional in character and representative of signals in said second band, voltage-quadrupling rectifiers in said third path for producing a third output unidirectional in character and representative of signals in said third band, and means for connecting said rectifiers in said second path and said rectifiers in said third path to the second input terminal of said recorder for applying a single, unidirectional signal to said second input representative of the combined signals in said second path and said third path for identifying the onset of high-frequency portions of reflection components of signals in said first path.

8. In seismic exploration,
means for generating signals representative of earth movements at a detecting station resulting from the application of energy to the earth at a sending station to produce seismic waves, said signals being characterized by the presence therein of reflection components including a frequency distribution uniquely representative of the onset of seismic reflections and materially differing from the frequency of said signals not including reflection components,
recording means for recording as a function of time related to the instant of initiation of said seismic waves at said sending stations said electrical signals due to said earth movements,
filtering means of the bandpass type,
means for applying said electrical signals to said filtering means for passage therethrough of said range of frequencies uniquely representative of the onset of said reflection components,
a voltage-multiplying circuit of the type including capacitors and diodes,
means connecting said filtering means to said voltage-multiplying circuit for producing an output therefrom, and
means for applying said output from said voltage-multiplying circuit to said recording means for recording that output in correlation with the recording of said electrical signals for enhanced identification of the occurrence of said frequency distributions uniquely representative of said seismic reflections.

9. In seismic exploration,
means for generating electrical signals representative of earth movements at a detecting station resulting from the application of energy to the earth at a sending station to produce seismic waves, said signals being characterized by the presence therein of reflection components including a frequency distribution uniquely representative of the onset of seismic reflections and materially differing from the frequency of said signals not including reflection components,
bandpass filtering means,
means for applying said electrical signals to said bandpass filtering means, said filtering means producing at an output thereof signals principally due to said frequencies uniquely representative of said onset of seismic reflections,
a voltage-multiplying circuit of the type including capacitors and diodes having input means connected to the output of said filtering means, said circuit producing output signals of enhanced amplitude, and
recording means connected to said circuit for recording, as a function of time related to the instant of initiation of the seismic waves giving rise to said reflections, said signals of enhanced amplitude and uniquely representative of the onset of said seismic reflections.

10. The system of claim 9 in which said voltage-multiplying circuit has output capacitors of size which with the recording means provide a relatively short time constant for developing a high output in the presence of signals the frequency of which is relatively high compared with the frequency of the signals materially attenuated by said bandpass filtering means.

References Cited in the file of this patent

UNITED STATES PATENTS

| | | |
|---|---|---|
| 1,784,439 | Hayes | Dec. 9, 1930 |
| 2,099,536 | Scherbatskoy | Nov. 16, 1937 |
| 2,276,709 | Wyckoff | Mar. 17, 1942 |
| 2,395,289 | Neufeld | Feb. 19, 1946 |
| 2,944,620 | Van Dijck | July 12, 1960 |
| 2,956,634 | Zemanek et al. | Oct. 18, 1960 |